C. L. HEISLER.

COAL PASSER FOR LOCOMOTIVE TENDERS.

APPLICATION FILED FEB. 23, 1916.

Reissued Aug. 1, 1916.

14,176.

4 SHEETS—SHEET 1.

Inventor.
Charles L. Heisler
By Wilson & Lee
Attys

C. L. HEISLER.

COAL PASSER FOR LOCOMOTIVE TENDERS.

APPLICATION FILED FEB. 23, 1916.

Reissued Aug. 1, 1916.

14,176.

4 SHEETS—SHEET 2.

*Inventor:*
*Charles L. Heisler*
*By Gilson & Gilson*
*Attys.*

C. L. HEISLER.

COAL PASSER FOR LOCOMOTIVE TENDERS.

APPLICATION FILED FEB. 23, 1916.

Reissued Aug. 1, 1916.

14,176.

4 SHEETS—SHEET 3.

*Inventor:*
*Charles L. Heisler*
*By* Gilson & Gilson
*Atty's*

C. L. HEISLER.

COAL PASSER FOR LOCOMOTIVE TENDERS.

APPLICATION FILED FEB. 23, 1916.

Reissued Aug. 1, 1916.

14,176.

4 SHEETS—SHEET 4.

*Inventor:*
*Charles L. Heisler*
*By* Wilson & Wilson
*Attys*

UNITED STATES PATENT OFFICE.

CHARLES L. HEISLER, OF SCHENECTADY, NEW YORK.

COAL-PASSER FOR LOCOMOTIVE-TENDERS.

14,176. Specification of Reissued Letters Patent. Reissued Aug. 1, 1916.

Original No. 1,088,418, dated February 24, 1914, Serial No. 777,138. Application for reissue filed February 23, 1916. Serial No. 80,070.

*To all whom it may concern:*

Be it known that I, CHARLES L. HEISLER, of Schenectady, in the county of Schenectady and State of New York, have invented a certain new and useful Improvement in Coal-Passers for Locomotive-Tenders, of which improvement the following is a specification.

My invention relates to appliances for mechanically passing coal from the rear to the forward portion of the coal bin of a locomotive tender, in order to place it within convenient reach of the fireman for supply as required to the firebox of the locomotive; and its objects are to effect a reduction of weight and cost in the construction of an appliance of such type; to obviate the necessity of expensive special modifications of tender construction heretofore ordinarily required for the application of such appliances; and to provide a self contained unitary mechanism, adaptable, without change, for application in connection with tender tanks of different designs and slope, and which may be applied either singly, or in duplicate for coal bins of extra width, and located so as not to obstruct access to the coal bin, while being at all times readily accessible.

The improvement claimed is hereinafter fully set forth.

Figure 1:
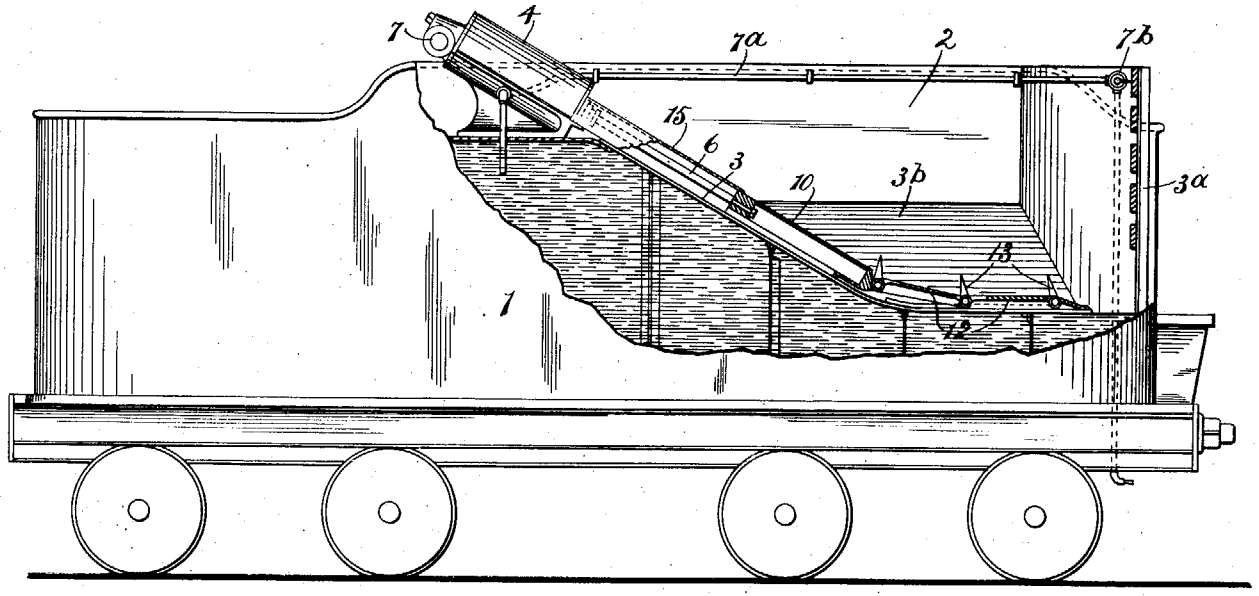
Figures 2, 5, 6:
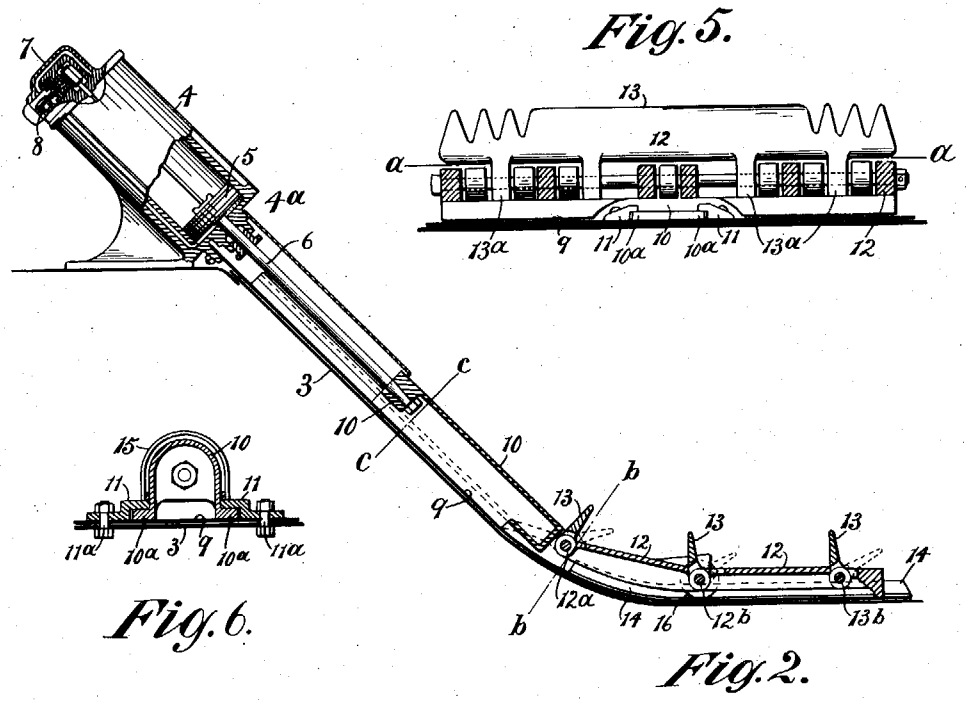
Figure 3:
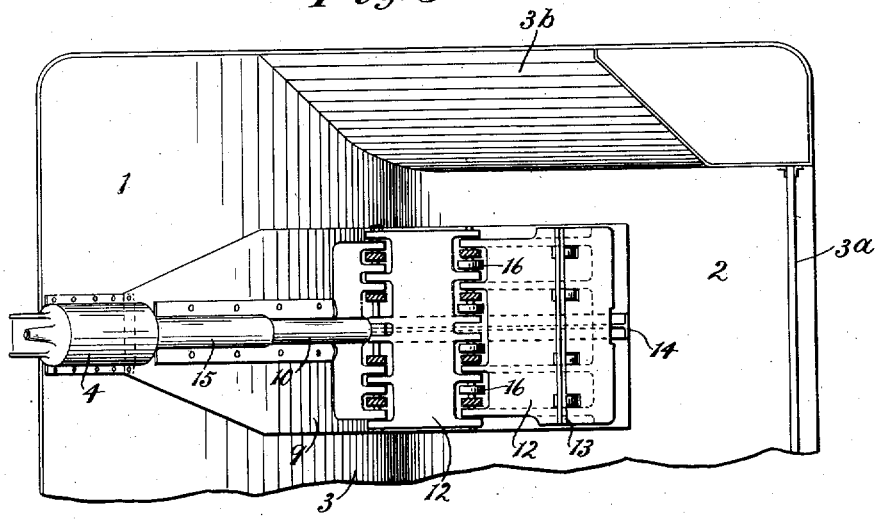
Figure 4:
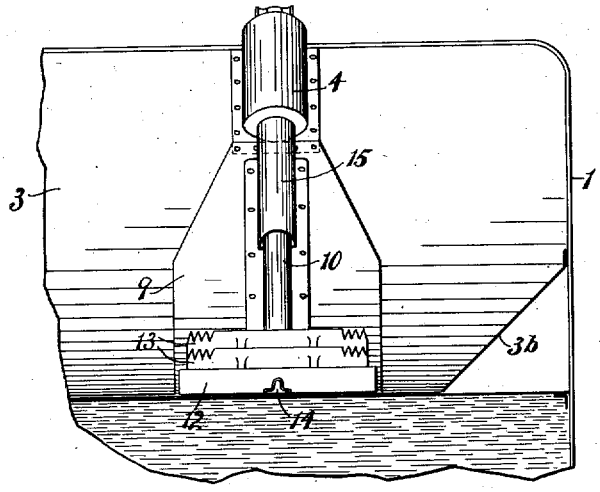
Figure 7:
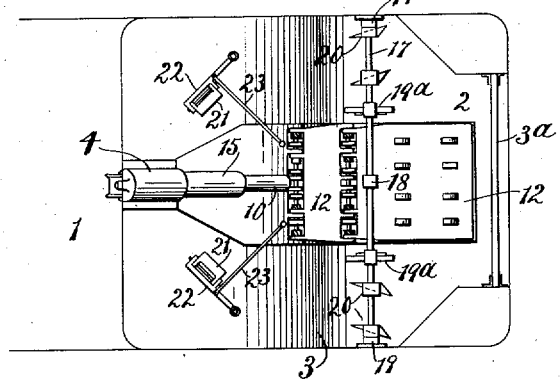
Figure 8:
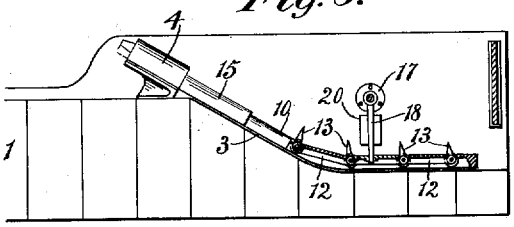
Figure 9:
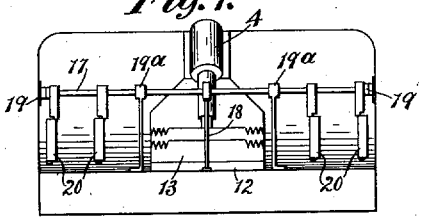
Figure 10:
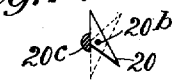
Figure 11:
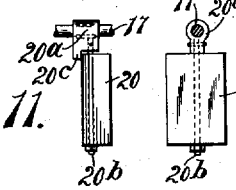
Figure 12:
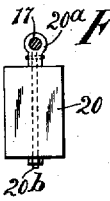

In the accompanying drawings; Figure 1 is a view, partly in side elevation and partly in longitudinal central section, of a locomotive tender, illustrating an application of my invention; Fig. 2, a vertical longitudinal central section through a coal passer embodying my invention; Fig. 3, a plan or top view, partly in section on the line *a—a* of Fig. 5, of the same; Fig. 4, a front view, in elevation; Figs. 5 and 6, transverse sections, on the lines *b—b* and *c—c*, respectively, of Fig. 2; Fig. 7 a plan or top view showing additional means for moving the fuel toward the coal carrier where the same is applied to a tender with a wide coal bin, or without sloping side walls; Fig. 8, a vertical longitudinal section of the same; Fig. 9, a front end view; and Figs. 10, 11 and 12, detail views of one of the vertically pivoted pusher sections carried by the horizontal shaft shown in Figs. 7, 8 and 9.

My invention is herein exemplified as applied in connection with a locomotive tender of a present standard form, having a water tank, 1, of so-called U form, with the usual coal space or bin, 2, interposed between its longitudinally extending side portions, at, and for some distance rearwardly from its front end. The central portion of the tank is forwardly and downwardly inclined at its front end, the plates of which central portion constitute the rear wall, 3, of the coal bin. The side walls of the fuel bin may also have an inclined or sloping portion $3^b$. The forward end of the coal bin is controlled by a movable coal gate, $3^a$, of the ordinary construction.

In the practice of my invention, a fluid pressure operating cylinder 4, the axis of which is inclined at a corresponding angle with that of the downwardly and forwardly inclined rear wall of the coal bin, is secured to the top of the tank, adjacent to the rear wall of the coal bin. The cylinder 4, is fitted with a properly packed piston 5, secured upon a piston rod, 6, which passes through a stuffing box, $4^a$, on the front head of the cylinder. Fluid under pressure, as steam or compressed air, is supplied to a valve chest 7, located on the rear head of the cylinder, through a pipe, $7^a$, controlled by a cock or valve, $7^b$, located within convenient reach of the fireman, and is admitted to and exhausted from opposite ends of the cylinder, to move the piston in alternately opposite directions therein, as from time to time desired, by a distribution valve 8, of any suitable and preferred known construction. The well known Westinghouse air pump valve is one which is desirably adapted for this service, and is herein shown as applied.

A reinforcing wear plate 9, is secured to the rear wall of the coal bin and the adjoining portion of the floor thereof, which, in the instance shown, is the top of the water bottom or central part of the forward portion of the tank. The lower end of the piston rod 6, is secured to a substantially T-shaped cross head 10, which is fitted to slide between guides 11, which overlap lateral flanges $10^a$, on the central portion of the cross head, and are secured to the wall 3, and wear plate 9, by bolts $11^a$. An articulated ram, comprising a plurality of carrier sections, 12, and one or more vibratable pusher sections, 13, is coupled to the cross head, 10, by a transverse hinge pin, $12^a$, and the carrier sections are coupled one to another by similar hinge pins $12^b$, said pins passing through lugs on the cross head and carrier sections. The pusher sections, 13, which are of substantially rectangular form, and may be toothed or serrated on their upper sides throughout the whole, or any desired portion, of their length, are provided with downwardly projecting lugs, 13[a], on their lower sides for the reception of the pins by which they are coupled to the carrier sections. In the instance shown, one pusher section is interposed between the cross head and the adjoining carrier section; another between the two carrier sections; and a third is located adjacent to the forward end of the forward carrier section, to which it is coupled by a hinge pin, 13[b].

The forward and backward traverses of the cross head, 10, when actuated by the piston of the operating cylinder, are made over the surface of the inclined reinforcing wear plate 9, and those of the carrier sections and pusher sections over said surface, the surface of the floor of the coal bin, and the connecting lower curved surface of the rear wall 3, the articulation of the sections permitting them to follow the change of direction of said surface. The true rectilineal movement of the sections is insured by a guide, 14, which is secured to the floor of the coal bin and fits in corresponding grooves in the plate sections. The piston rod is protected from contact with the fuel in the coal bin by a segmental shield, 15, extending from the operating cylinder to the line of the upper end of the cross head when the latter is at the forward extremity of its traverse.

The pusher sections, 13, are pivoted freely on their hinge pins, and are swung downwardly thereon, in the rearward traverses of the piston, by the pressure of the coal above them, into the positions shown in dotted lines in Fig. 2. They are correspondingly swung upwardly, into the positions shown in full lines, by the pressure of the coal, in the forward traverses of the piston. If desired, rollers, 16, may be mounted on the hinge pin, 12[b], to assist in supporting the carrier sections and diminishing the frictional resistance to its movement.

In the operation of the appliance, the coal is moved forwardly in the coal bin by the action thereon of the pusher sections, 13, during the downward traverse of the piston, and thereby placed within reach of the fireman's shovel, when working on the foot plate of the locomotive, the upward traverses of the piston returning the pusher sections to position for succeeding operations. The leading and characteristic feature of my invention, and one by which, so far as my knowledge and information extend, it is distinguished from the construction of the prior art, consists in an articulated coal pushing device, adapted, by reason of the articulation of its sections, to follow and conform to the planes of the floor and rear walls of the coal bin, and, for its application and operation, involving no change whatever in the form or relation of the boundaries of the coal bin over which it traverses. The practical structural and operative advantage of this feature will be obvious to those familiar with railroad service.

If the slope of the rear wall, 3, is not sufficiently steep to readily gravitate the fuel to the bottom of the bin, supplemental pushers, 21, pivotally mounted on swinging arms 22, and operated by coupling rods, 23, connected to the cross head 10, may be provided, as illustrated in Fig. 7, of the drawings.

When the sloping sections, 3[b], of the side walls are omitted, or when using a single coal passer in a wide bin, additional means may be employed for assisting the movement of the fuel from the sides toward the middle of the bin. As shown in Figs. 7 to 12, such additional means comprises a transverse rocking shaft, 17 mounted in bearings, 19, in the opposite side walls of the fuel bin, a short distance above the bottom, the shaft being further supported by additional bearing brackets, 19[a], if desired, and carrying a plurality of downwardly projecting pusher sections, 20, which are mounted to swing upon vertical hinge pins, 20[b], supported in arms 20[a], fixed upon the shaft. For the purpose of imparting a rocking motion to the shaft, the same is provided with a rigid arm, 18, at its middle portion projecting downward, and coupled with one of the reciprocating carrier sections, 12. As the shaft is thus oscillated to and fro, the pusher sections, 20, swing through a limited angle about their vertical pivots, as determined by the stop lugs 20[c], always presenting an outward impelling face to the fuel upon the forward movement, and thereby moving the fuel away from the side walls and toward the carrier sections of the passer at the middle of the bin.

It will, of course, be understood that two or more of the coal passer units may be employed in wide fuel bins, if preferred.

I claim as my invention and desire to secure by Letters Patent:—

1. In a locomotive tender coal passer, the combination of a fluid pressure operating cylinder adapted for attachment to a tender tank, a piston fitting therein, and a coal passing mechanism comprising a plurality of articulated sections coupled to said piston and adapted to be traversed, by the movement thereof, forwardly and rearwardly over the floor and rear wall of a tender coal bin.

2. In a locomotive tender coal passer, the combination of a fluid pressure operating cylinder adapted for attachment to a tender tank, a piston fitting therein, and a coal passing mechanism comprising a plurality of articulated carrier sections and one or more pusher sections hinged thereto, said mechanism being coupled to said piston, and adapted to be traversed, by the movements thereof, forwardly and rearwardly over the floor and rear wall of a tender coal bin.

3. In a locomotive tender coal passer, the combination of a fluid pressure operating cylinder adapted for attachment to a tender tank, a piston fitting therein, a cross head fixed on the rod of said piston, guides engaging said cross head for insuring its movement parallel with the inclined rear wall of a tender coal bin, and a coal passing mechanism comprising a plurality of articulated sections coupled, through said cross head, to the piston, and adapted to be traversed, by the movements thereof, forwardly and rearwardly over the floor and rear wall of a tender coal bin.

4. In a locomotive tender coal passer, the combination, of a movable pusher member adapted to be mounted to reciprocate forwardly and rearwardly upon and parallel with an inclined rear wall of the coal bin of a tender, a motor secured to a fixed member of the tender, and operating means connecting said motor with the pusher member.

5. In a locomotive tender coal passer, the combination of a plurality of articulated carrier sections adapted to be mounted to reciprocate forwardly and rearwardly upon the floor and inclined rear wall of the tender coal bin, and a fluid pressure motor for reciprocating said sections.

6. In a locomotive tender coal passer, the combination of a plurality of articulated carrier sections adapted to be mounted to reciprocate forwardly and rearwardly upon the floor and inclined rear wall of the tender coal bin, one or more pusher sections pivotally mounted transversely upon said carrier sections, and a fluid pressure motor for reciprocating said carrier sections.

7. In a locomotive tender coal passer, the combination of a cross head section adapted to be mounted to reciprocate upon the inclined rear wall of the coal bin, a piston and rod connected to said cross head, a cylinder containing said piston, and a guard covering said rod and a portion of the cross head when the same is reciprocated.

8. In a locomotive tender coal passer, the combination with a movable section adapted to be mounted to reciprocate upon the inclined rear wall of the tender coal bin, and a fluid pressure motor for operating the same, of supplemental pusher sections mounted to traverse over the inclined rear wall to assist the gravitating movement of the fuel.

9. In a locomotive tender coal passer, the combination with a movable section adapted to be mounted to reciprocate upon the inclined rear wall of the tender coal bin, and a fluid pressure motor for operating the same, of swinging arms mounted on the said inclined rear wall, supplemental pusher sections pivoted on said arms, and connections from said arms to the reciprocating section.

10. In a locomotive tender coal passer, the combination with a carrier section mounted to reciprocate upon the middle portion of the floor of the fuel bin, of pusher sections mounted to traverse near the side walls to impel the fuel toward the carrier at the middle portion.

11. In a locomotive tender coal passer, the combination with a carrier section mounted to reciprocate forwardly and rearwardly through the middle portion of the coal bin, of a rock shaft extending transversely of the fuel bin, pivoted pusher sections depending from said shaft near the side walls, and means for oscillating said shaft.

12. In a locomotive tender coal passer, the combination with a carrier section mounted to reciprocate forwardly and rearwardly through the middle portion of the coal bin, of a rock shaft extending transversely of the fuel bin, an arm fixed on said shaft and coupled to the carrier section, and pivoted pusher sections depending from said shaft near the side walls for impelling the fuel toward the middle portion.

13. The combination, with a tender fuel bin having a bottom, a stationary sloping rear wall, oppositely disposed side walls, and an open front for fuel discharge, of a fluid pressure motor operating parallel with the rear wall, a coal passer section connected to said motor and adapted to reciprocate on said wall, and means fixed independently of the side walls, for guiding said coal passer section.

14. The combination, with a tender fuel bin having a bottom, a stationary sloping rear wall, oppositely disposed side walls, and an open front for fuel discharge, of a fluid pressure cylinder fixed at the rear of the rear wall, a piston reciprocating therein parallel with said wall, a coal passer section connected to said piston and adapted to be reciprocated thereby on said wall, and guides fixed to said wall and engaging said coal passer section.

15. The combination, with a tender fuel bin having a bottom, a stationary sloping rear wall, oppositely disposed side walls, and an open front for fuel discharge, of a fluid pressure motor operating parallel with the rear wall, a reciprocating pusher member comprising a cross head connected to the motor, and a feathering member disposed transversely on and hinged to the cross head and adapted to impel fuel toward the front of the bin on the forward stroke of the cross head and to minimize the resistance of the fuel on the rearward stroke, and means, fixed independently of the side walls, for guiding the cross head.

16. The combination, with a tender fuel bin having a bottom, a stationary sloping rear wall, oppositely disposed side walls, and an open front for fuel discharge, of a fluid pressure motor operating parallel with the rear wall, a coal passer section connected to said motor and adapted to reciprocate on said wall independently of connection with the side walls, and guides, fixed independently of the side walls, and engaging the coal passer sections.

17. In a locomotive tender coal passer, in combination, a suitable motor, a plurality of fuel pushing elements for advancing fuel, such elements being articulated together and adapted to reciprocate over a fuel supporting wall of a tender bin, and operative connection between the motor and pushing elements.

18. In combination, a locomotive tender having a fuel bin and a shoveling platform, a plurality of pushing elements articulated together and reciprocable over a fuel-supporting wall of the bin for advancing fuel to the shoveling platform, and power means for actuating the pushing elements.

CHARLES L. HEISLER.